United States Patent
Metrulas (10) Patent No.: US 9,694,314 B2
(45) Date of Patent: Jul. 4, 2017

(54) OBIGGS ASM PERFORMANCE MODULATION VIA TEMPERATURE CONTROL

(71) Applicant: Parker-Hannifin Corporation, Cleveland, OH (US)

(72) Inventor: Stephen Christopher Metrulas, Tustin, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 28 days.

(21) Appl. No.: 14/865,389

(22) Filed: Sep. 25, 2015

(65) Prior Publication Data

US 2016/0107116 A1    Apr. 21, 2016

Related U.S. Application Data

(60) Provisional application No. 62/064,050, filed on Oct. 15, 2014.

(51) Int. Cl.
| | |
|---|---|
| *B01D 53/30* | (2006.01) |
| *B01D 53/22* | (2006.01) |
| *B64D 37/32* | (2006.01) |
| *G05B 15/02* | (2006.01) |

(52) U.S. Cl.
CPC ........... *B01D 53/30* (2013.01); *B01D 53/22* (2013.01); *B64D 37/32* (2013.01); *G05B 15/02* (2013.01); *B01D 2053/224* (2013.01); *B01D 2256/10* (2013.01); *B01D 2257/104* (2013.01); *B01D 2258/06* (2013.01); *B01D 2259/4575* (2013.01)

(58) Field of Classification Search
CPC .......... B01D 2053/224; B01D 2256/10; B01D 2257/104; B01D 2258/06; B01D 2259/4575; B01D 53/22; B01D 53/30; B64D 37/32; G05B 15/02
See application file for complete search history.

(56) References Cited

U.S. PATENT DOCUMENTS

| | | | | |
|---|---|---|---|---|
| 6,491,739 | B1 * | 12/2002 | Crome | B01D 63/02 |
| | | | | 95/14 |
| 7,172,157 | B2 | 2/2007 | Jones | |
| 2004/0000353 | A1 * | 1/2004 | Jones | B64D 13/08 |
| | | | | 141/64 |
| 2005/0092177 | A1 * | 5/2005 | Bonchonsky | B01D 53/0454 |
| | | | | 95/138 |
| 2006/0011063 | A1 * | 1/2006 | Zhou | B01D 53/228 |
| | | | | 96/10 |
| 2007/0245802 | A1 * | 10/2007 | Austerlitz | G01N 29/024 |
| | | | | 73/24.01 |
| 2010/0155046 | A1 | 6/2010 | Surawski | |
| 2010/0176245 | A1 * | 7/2010 | Isella | B64D 37/32 |
| | | | | 244/135 R |
| 2014/0053726 | A1 | 2/2014 | Evosevich et al. | |
| 2014/0116249 | A1 | 5/2014 | Evosevich et al. | |

(Continued)

*Primary Examiner* — Christopher P Jones
(74) *Attorney, Agent, or Firm* — Renner, Otto, Boisselle & Sklar, LLP.

(57) ABSTRACT

A controller for controlling an on-board inert gas generation system (OBIGGS) having an air separation module (ASM) dynamically modulates a temperature setpoint for air inlet temperature to the ASM to provide a minimum temperature setpoint that produces a prescribed oxygen concentration at an output of the ASM.

22 Claims, 5 Drawing Sheets

(56) References Cited

U.S. PATENT DOCUMENTS

| | | | |
|---|---|---|---|
| 2015/0040984 A1* | 2/2015 | Ji | F02C 7/25 137/1 |
| 2015/0360170 A1* | 12/2015 | Evosevich | B64D 37/32 95/54 |
| 2016/0009407 A1* | 1/2016 | Fukuda | B64D 37/32 96/10 |
| 2016/0361684 A1* | 12/2016 | Ranjan | B01D 53/22 |

* cited by examiner

OBIGGS ASM PERFORMANCE MODULATION VIA TEMPERATURE CONTROL

RELATED APPLICATION DATA

This application claims the priority of U.S. Provisional Application No. 62/064,050, filed on Oct. 15, 2014, which is hereby incorporated by reference in its entirety.

FIELD OF INVENTION

The present invention relates generally to a flammability reduction system and, more particularly, to control of temperature at the inlet of an Air Separation Module of a flammability reduction system.

BRIEF DESCRIPTION OF THE DRAWINGS

Aircraft may use an on board inert gas generating system ("OBIGGS") to minimize fuel tank accidents. Potentially dangerous fuel and air mixtures in the air space (ullage) in fuel tanks are diluted and minimized by reducing the oxygen content of the ullage. The OBIGGS accomplishes this by adding nitrogen enriched air (NEA) to the ullage. The OBIGGS separates oxygen from ambient air and pumps inert, oxygen depleted NEA to the fuel tanks.

The OBIGGS may produce NEA by using permeable membranes in an air separation module ("ASM"). The ASM typically has a bundle of hollow, permeable fiber membranes packaged in a cylindrical shell with an inlet, an outlet at the ends of the shell and a side vent port. Pressurized air enters the ASM inlet and, as it passes through the hollow fibers, oxygen is separated from the air stream due to diffusion through the fiber walls. Oxygen exits through the side vent port and can be captured, but often the oxygen is considered a waste gas and is exhausted overboard. The remaining air is deemed to be nitrogen enriched because, due to normal levels of gas in the air, if all the oxygen is removed from air, about 97% of the remaining air is nitrogen. Normal concentrations of oxygen in the NEA are usually above zero.

The remaining NEA flows out of the ASM via the outlet port and is distributed to the ullage space of the fuel tank or tanks for the purpose of inerting the fuel tanks and reducing flammability exposure. The ASM efficiency, in terms of permeability of oxygen through the membranes, improves as temperature is increased.

Pressurized air used for NEA generation will usually originate from either an engine bleed or from another pressure source within the aircraft. With an engine bleed system, compressed hot air is usually cooled by a heat exchanger to an optimal temperature before being vented to an ASM.

SUMMARY OF THE INVENTION

The useable life of ASMs is related to air temperature provided to the ASM. The lower the temperature, the longer the ASM life. However, this longer life comes at the expense of lower efficiency/performance of the ASM.

Conventional inert gas generating systems typically have temperature controls. However, the temperature control settings of such conventional systems are statically selected based on analysis during a system design phase. Conventional systems do not adjust temperature based on the current performance capability of the system.

An apparatus and method in accordance with the present disclosure can increase the usable service life of an ASM, thereby decreasing aircraft maintenance costs. In accordance with the present disclosure, ASM inlet temperature is dynamically modulated to a minimum required value, thereby extending the life of the ASM while also providing the required performance from the ASM. More particularly, various data (e.g., temperature data, oxygen concentration data (e.g., percentage of oxygen), pressure data and aircraft data) are used to calculate an optimal air temperature setpoint for the ASM inlet that can produce the necessary gas.

According to one aspect of the invention, a controller for controlling an on-board inert gas generation system (OBIGGS) having an air separation module (ASM) includes: a processor and memory; logic stored in the memory and executable by the processor, the logic including logic configured to dynamically modulate a temperature setpoint for air inlet temperature to the ASM to provide a minimum temperature setpoint that produces a prescribed oxygen concentration at an output of the ASM.

In one embodiment, the logic configured to dynamically modulate the temperature setpoint includes: logic configured to determine an expected oxygen concentration at the output of the ASM; and logic configured to determine the ASM inlet temperature setpoint based on the expected oxygen concentration.

In one embodiment, the logic configured to determine an expected oxygen concentration includes logic configured to determine the expected oxygen concentration based on at least one of an actual inlet pressure to the ASM, an actual inlet temperature to the ASM, or aircraft data.

In one embodiment, the logic configured to determine the expected oxygen concentration based on at least one of an actual inlet pressure to the ASM, an actual inlet temperature to the ASM, or aircraft data includes logic configured to use at least one of atmospheric pressure, altitude, or bleed pressure as the aircraft data.

In one embodiment, the logic configured to determine the ASM inlet temperature setpoint based on the expected oxygen concentration includes logic configured to compare the expected oxygen concentration to an actual oxygen concentration output by the ASM, and to vary the air inlet temperature setpoint based on the comparison.

In one embodiment, the logic configured to vary the air inlet temperature setpoint includes: logic configured to compare the expected oxygen concentration to the actual oxygen concentration; logic configured to decrease the air inlet temperature setpoint when the expected oxygen concentration is greater than the actual oxygen concentration; and logic configured to increase the air inlet temperature setpoint when the expected oxygen concentration is less than the actual oxygen concentration.

In one embodiment, the logic configured to increase or decrease the air inlet temperature is further based on a pressure of bleed air provided to the OBIGGS.

In one embodiment, the logic configured to compare the expected oxygen concentration includes logic configured to implement a hysteresis function.

In one embodiment, the logic configured to implement the hysteresis function includes: logic configured to calculate a high expected oxygen concentration threshold and a low expected oxygen concentration threshold; logic configured to use the high expected oxygen concentration threshold as a basis for increasing the air inlet temperature setpoint; and logic configured to use the low expected oxygen concentration threshold as a basis for decreasing the air inlet temperature setpoint.

According to another aspect of the invention, an on-board inert gas generation system (OBIGGS) includes an air separation module (ASM), and a controller as described herein.

In one embodiment, the system includes: a temperature sensor for measuring the air inlet temperature to the ASM; a pressure sensor for measuring the air inlet pressure to the ASM; and an oxygen sensor for measuring an oxygen concentration of air exiting the ASM, the temperature, pressure and oxygen sensors communicatively coupled to the controller.

In one embodiment, the system includes: a heat exchanger including an inlet for receiving air and an outlet for expelling temperature-modified air, the outlet in fluid communication with an inlet to the ASM; and a valve having an inlet in fluid communication with the heat exchanger inlet and an outlet in fluid communication with the heat exchanger outlet, wherein the controller is operatively coupled to the valve to control a temperature of the air provided to the ASM.

According to another aspect of the invention, a method for controlling an on-board inert gas generation system (OBIGGS) having an air separation module (ASM) includes dynamically modulating a temperature setpoint for air inlet temperature to the ASM to provide a minimum temperature setpoint that produces a prescribed oxygen concentration at an output of the ASM.

In one embodiment, dynamically generating the temperature setpoint includes: determining an expected oxygen concentration output by the ASM; and determining the ASM inlet temperature setpoint based on the expected oxygen concentration.

In one embodiment, determining an expected oxygen concentration includes determining the expected oxygen concentration based on at least one of an actual inlet pressure to the ASM, an actual inlet temperature to the ASM, or aircraft data.

In one embodiment, determining the expected oxygen concentration based on at least one of an actual inlet pressure to the ASM, an actual inlet temperature to the ASM, or aircraft data includes using at least one of atmospheric pressure, altitude, or bleed pressure as the aircraft data.

In one embodiment, determining the ASM inlet temperature setpoint based on the expected oxygen concentration includes comparing the expected oxygen concentration to an actual oxygen concentration output by the ASM, and varying the air inlet temperature setpoint based on the comparison.

In one embodiment, varying the air inlet temperature setpoint includes: comparing the expected oxygen concentration to the actual oxygen concentration; decreasing the air inlet temperature setpoint when the expected oxygen concentration is greater than the actual oxygen concentration; and increasing the air inlet temperature setpoint when the expected oxygen concentration is less than the actual oxygen concentration.

In one embodiment, increasing or decreasing the air inlet temperature is further based on a pressure of bleed air provided to the OBIGGS.

In one embodiment, comparing the expected oxygen concentration includes implementing a hysteresis function.

In one embodiment, implementing the hysteresis function includes: calculating a high expected oxygen concentration threshold and a low expected oxygen concentration threshold; using the high expected oxygen concentration threshold as a basis for increasing the air inlet temperature setpoint; and using the low expected oxygen concentration threshold as a basis for decreasing the air inlet temperature setpoint.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings

BRIEF DESCRIPTION OF THE DRAWINGS

Many aspects of the invention in accordance with the present disclosure can be better understood with reference to the following drawings. The components in the drawings are not necessarily to scale, emphasis instead being placed upon clearly illustrating the principles in accordance with the present disclosure. Likewise, elements and features depicted in one drawing may be combined with elements and features depicted in additional drawings. Additionally, in the drawings, like reference numerals designate corresponding parts throughout the several views.

DETAILED DESCRIPTION

ASM performance degrades faster at higher inlet temperatures. An apparatus and method in accordance with the present disclosure dynamically modulates ASM inlet temperature to a minimum temperature that provides a required level of performance from the ASM (e.g., a prescribed oxygen concentration at an output of the ASM). As used herein, "modulating" the temperature setpoint is defined as changing or adjusting the temperature setpoint to produce a desired result. By minimizing ASM inlet temperature, the rate at which the ASM degrades is reduced, thereby significantly extending the life of the ASM. The minimum temperature can be derived from sensor readings on ASM product flow such as Nitrogen Enriched Air (NEA) and/or readings of ASM source pressure and temperature.

The apparatus and method in accordance with the present disclosure dynamically calculate an ASM air inlet temperature setpoint that yields a desired NEA or Ullage Oxygen concentration. In this regard, ASM performance is compared against a minimum required ASM system performance and, based on the comparison, ASM air inlet temperature setpoint is dynamically modulated to provide optimal ASM performance.

By dynamically modulating the ASM air inlet temperature setpoint, the regulated temperature utilized by the ASM when it is new/efficient is significantly lower than the regulated temperature utilized by the ASM when it is old/inefficient. Accordingly, the life of the ASM is extended when compared to conventional methods of providing air to an ASM, as for a significant portion of its usable life a lower air inlet temperature is seen by the ASM.

Figure 1:
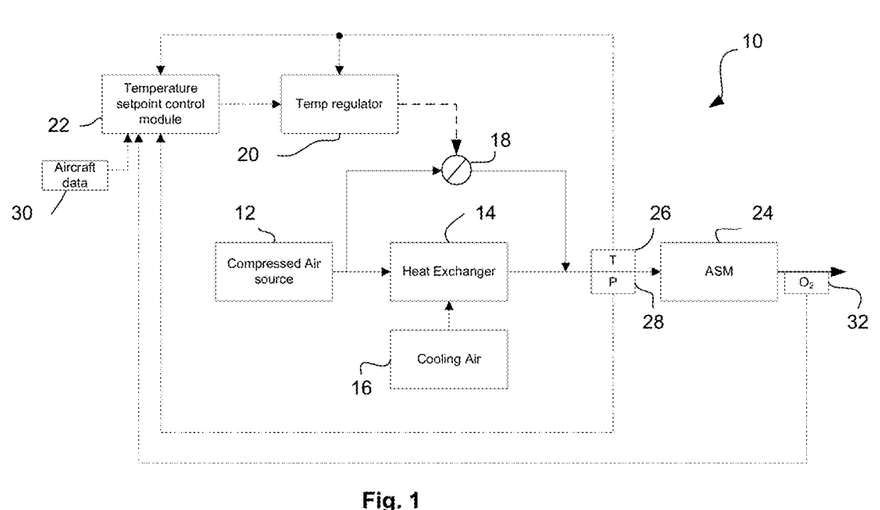
FIG. 1 is a block diagram illustrating an exemplary OBIGGS system in accordance with the present disclosure.

Referring now in detail to the drawings and initially to FIG. 1, an exemplary embodiment of an air separation system in accordance with the present disclosure is indicated generally by reference numeral 10. The illustrated system 10 is designed for use in an on-board inert gas generating system of an aircraft that supplies nitrogen-enriched air (NEA) to the fuel tank or tanks of an aircraft, and thus will chiefly be designed in this context. It will be appreciated, however, that the NEA can be used for inerting cargo holds and other void spaces in an aircraft. Moreover, the underlying principles in accordance with the present disclosure have applicability to non-aircraft applications where a need exists for a supply of relatively inert, nitrogen-enriched air.

The system 10 generally comprises a compressed air source 12 that provides compressed air to the system 10. Typically, the compressed air source 12 is an air bleed from an aircraft engine, although other compressed air sources may be utilized (e.g., a compressor driven by a prime mover, etc.). The compressed air source 12 is in fluid communication with an inlet of a heat exchanger 14, which exchanges heat in the received air with cooling air 16, such as ambient air forced through the heat exchanger 14 as is conventional. In this manner, the air temperature at an outlet of the heat exchanger 14 is lower than the air temperature at the inlet of the heat exchanger 14. The heat exchanger 14, for example, may be a conventional air-to-air or air-to-liquid heat exchanger.

A fluid valve 18, which may be a variable position valve, can include an inlet that is in fluid communication with the inlet of the heat exchanger 14, and an outlet that is in fluid communication with the outlet of the heat exchanger 14 (the valve is connected in parallel with the heat exchanger such that the valve 18 also receives compressed air from the compressed air source 12). Based on a position of the valve 18, a temperature of the air at the outlet of the heat exchanger 14 can be manipulated, e.g., by mixing the cooled air from the output of the heat exchanger 14 with non-cooled air from the output of the valve 18.

The outlet of the heat exchanger 14 and valve 18 are in fluid communication with an inlet of ASM 24. The ASM 24 is configured to extract oxygen from the received air to produce NEA at an outlet of the ASM 24, and may be a conventional membrane-type ASM.

A temperature regulator 20 is operatively coupled to the valve 18 so as to control a position of the valve 18. Based on an ASM air inlet temperature setpoint as provided by a temperature setpoint control module 22, the temperature regulator 20 generates a command for altering a valve position using a method in accordance with the present disclosure.

In one embodiment the temperature setpoint control module 22 is a computer controller that includes a processor and memory. Logic in the form of executable code is stored in memory, and when executed by the processor causes the processor to carry out the method described herein. In another embodiment, the temperature setpoint control module 22 is embodied as a hardware circuit, such as an application-specific integrated circuit (ASIC) or the like.

In dynamically determining the ASM inlet air temperature, the temperature setpoint control module 22 receives various data from a temperature sensor 26, pressure sensor 28, aircraft data 30 and oxygen sensor 32, each of which may be communicatively coupled to the temperature setpoint control module 22. In particular, the temperature sensor 26 provides an actual temperature of the air entering the inlet of the ASM 24, while the pressure sensor 28 provides an actual pressure of the air entering the ASM. Aircraft data 30, such as atmospheric pressure, altitude, bleed pressure, ambient air temperature, etc. is also provided to the temperature setpoint control module 22. Such aircraft data may be provided, for example, from a flight control computer, measurement systems, or the like. Oxygen sensor 32 provides an actual oxygen concentration (e.g., percent oxygen) in the air output by the ASM. As will be discussed in more detail below, the temperature setpoint control module 22 utilizes data from the temperature sensor 26, pressure sensor 28, aircraft data 30 and/or oxygen sensor 32 to dynamically generate an optimum temperature setpoint for regulating an air inlet temperature to the ASM 24.

Figure 2:
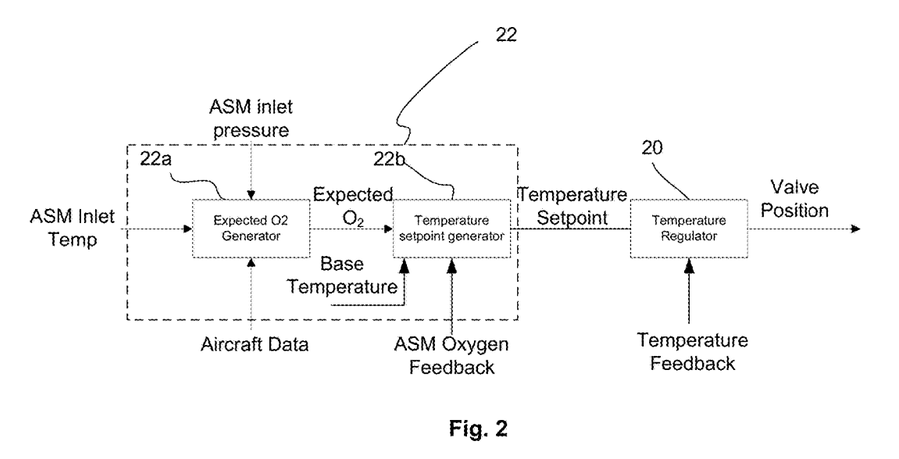
FIG. 2 illustrates a block diagram of an exemplary air inlet temperature setpoint control module in accordance with the present disclosure.

With further reference to FIG. 2, illustrated in more detail is the temperature setpoint control module 22, which provides an air inlet temperature setpoint to the temperature regulator 20. The temperature setpoint control module 22 includes an expected OXYGEN generator 22a, which determines an expected oxygen output for the ASM 24. The expected oxygen concentration as determined by the expected oxygen generator 22a is provided to a temperature setpoint generator 22b, which uses the expected oxygen concentration to determine an air inlet temperature setpoint for the ASM 24. The ASM air inlet temperature setpoint is provided to the temperature regulator 20, which controls the valve 18 in order to provide the desired temperature at the inlet of the ASM 24.

In determining the expected oxygen concentration from the ASM 24, the expected oxygen generator 22a uses at least one of an actual inlet pressure to the ASM 24, an actual inlet temperature to the ASM 24, or aircraft data (e.g., atmospheric pressure, altitude, bleed pressure, etc.). For example, the expected oxygen generator 22a may use the ASM inlet pressure as determined by pressure sensor 28, the ASM inlet temperature as determined by temperature sensor 26, and/or aircraft data 30, which may be provided by a flight control computer, other sensors, etc., to access a database that stores expected oxygen concentration for an ASM based on various operating parameters.

Figure 3:
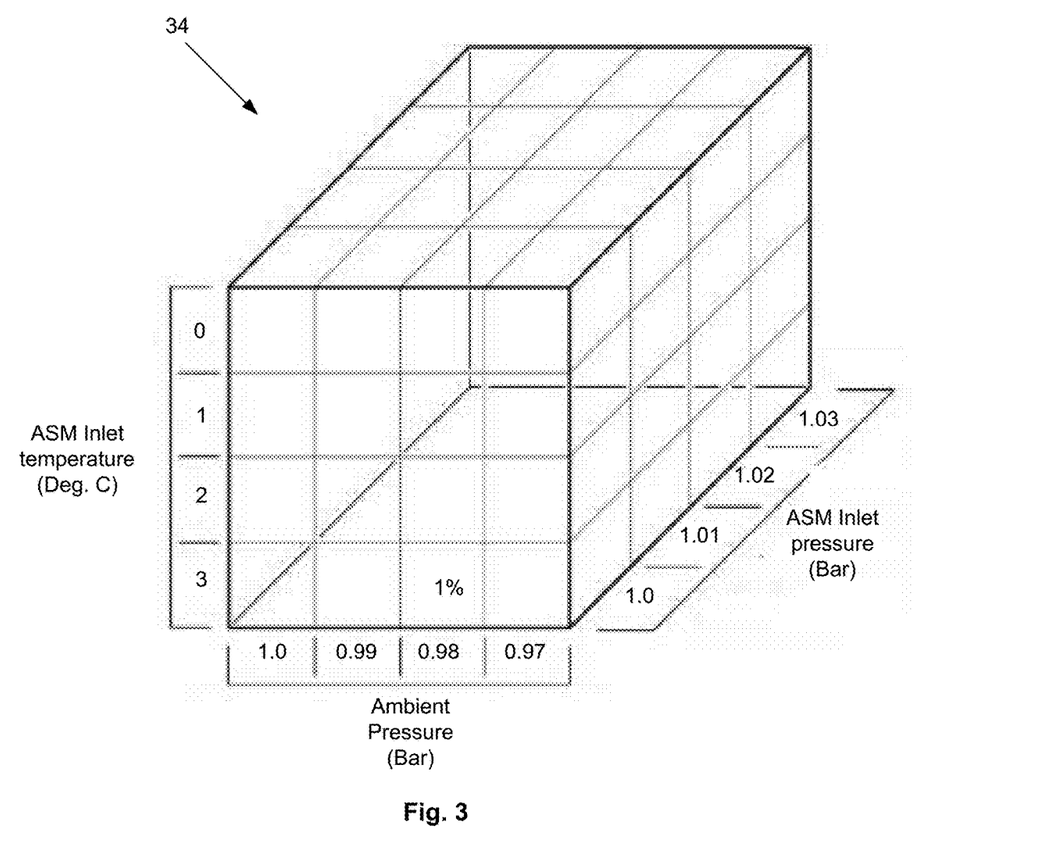
FIG. 3 illustrates an exemplary database that may be used in the method in accordance with the present disclosure.

Referring briefly to FIG. 3, an exemplary database 34 is illustrated that can be used to determine an expected oxygen concentration from the ASM 24 based on ASM inlet pressure, ASM inlet air temperature, and ambient air pressure. Stored within the database 34 are a multitude of entries, each corresponding to an expected oxygen from the ASM 24 for the corresponding ASM inlet pressure, ASM inlet temperature and ambient pressure. For example, if the measured ASM inlet temperature is 45 degrees C., the measured ASM inlet pressure is 3.00 bar, and the ambient pressure is 0.5 bar, the expected oxygen concentration generator 22a will retrieve a value of 3% as the expected oxygen concentration from the ASM 24. While a three-dimensional database is illustrated, it will be appreciated that larger or smaller dimensioned databases may be used without departing from the scope of the invention.

The expected oxygen concentration generator 22a provides the expected oxygen concentration to the temperature setpoint generator 22b, which compares the expected oxygen concentration to the actual oxygen concentration as measured by oxygen sensor 32, and varies the air inlet temperature setpoint based on the comparison. More particularly, if the expected oxygen concentration output by the ASM 24 is more than the actual oxygen concentration output by the ASM, then the ASM 24 is operating more efficiently than needed and thus the air inlet temperature can be reduced. Conversely, if the expected oxygen concentration output by the ASM 24 is less than the actual oxygen concentration output by the ASM, then the ASM 24 is operating less efficiently than needed and therefore the air inlet temperature needs to be increased to enhance ASM efficiency.

In increasing or decreasing the ASM air inlet temperature setpoint, the temperature setpoint generator 22b may add or subtract a prescribed value to a base temperature setpoint, allow the temperature to reach the new setpoint, and then make another comparison of the actual oxygen concentration to the expected oxygen concentration. The base temperature setpoint may be a calculated temperature setpoint that provides optimal operation for an ASM 24 that is newly installed to the aircraft (and thus efficiency is approximately that of a new/efficient ASM). The prescribed value for incrementing/decrementing the setpoint may be a fixed value that is stored in memory. Additionally or alternatively, the prescribed value may be dynamically determined based on various operating parameters. The prescribed value may be the same for a temperature setpoint increase and a temperature setpoint decrease, or there may be different values for the temperature setpoint increase and temperature setpoint decrease. Additionally, a hysteresis may be built into the temperature setpoint generator 22b such that temperature setpoint changes are not made when the difference between the actual oxygen concentration and the expected oxygen concentration is within a prescribed window.

For example, a high expected oxygen concentration threshold and a low expected oxygen concentration threshold can be calculated based on a percentage of the expected oxygen concentration (e.g., using a prescribed tolerance, such as 5% or other value as needed). Thus, the high expected oxygen concentration threshold may be 5% higher than the expected oxygen concentration, and the low expected oxygen concentration threshold may be 5% lower than the expected oxygen concentration. The high expected oxygen concentration threshold can be used as the basis for increasing the ASM air inlet temperature setpoint, while the low expected oxygen concentration threshold can be used as a basis for decreasing the ASM air inlet temperature setpoint.

Figure 4:
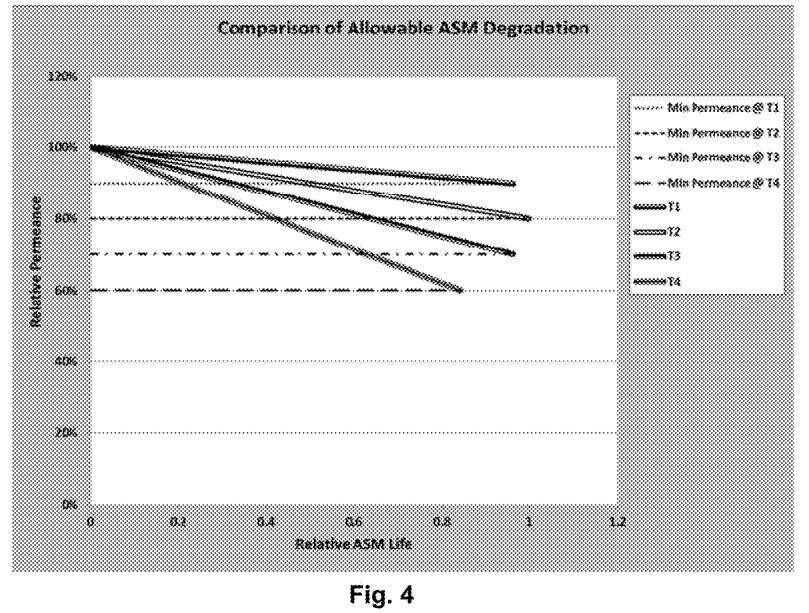
FIG. 4 is a graph illustrating relative performance of an ASM over the life of the ASM using a conventional fixed air inlet temperature setpoint.

Referring to FIG. 4, illustrated is a graph detailing how ASM inlet air temperature might be selected using a traditional system. As higher temperatures result in both higher performance and faster ASM degradation, the system designer would select a temperature control point that balanced the performance increase with the degradation rate increase, in order to maximize the ASM life.

Figure 5:
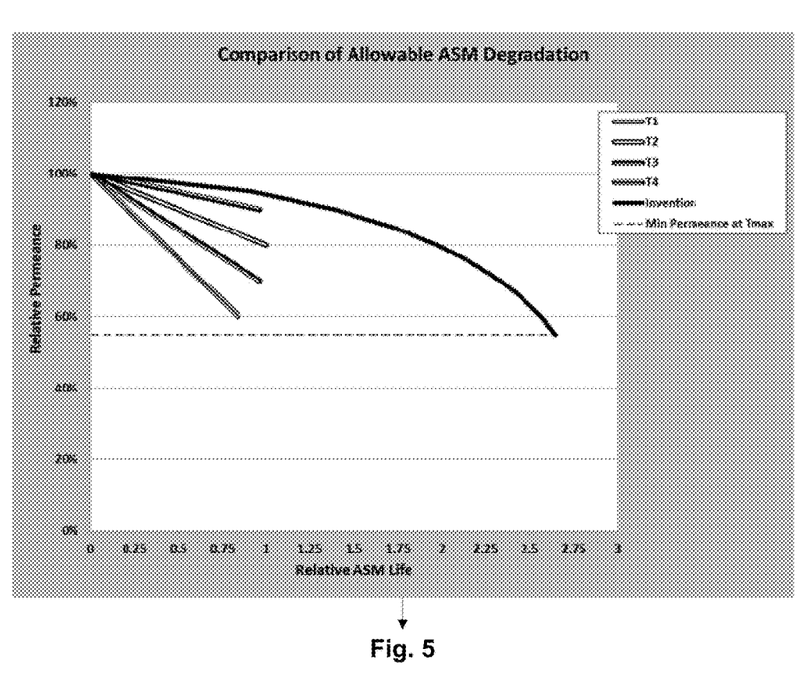
FIG. 5 is a graph comparing relative performance of an ASM over the life of the ASM for a conventional fixed ASM air inlet temperature setpoint and a variable ASM air inlet temperature setpoint in accordance with the present disclosure.

Referring to FIG. 5, an advantage of the apparatus and method in accordance with the present disclosure is shown relative to the traditional system temperature selection method. By continually monitoring the performance of the ASM 24, the minimum amount of ASM life that is required to perform the required inerting operation is consumed. This results in a slower rate of degradation and ultimately a significantly longer ASM life.

Figure 6:
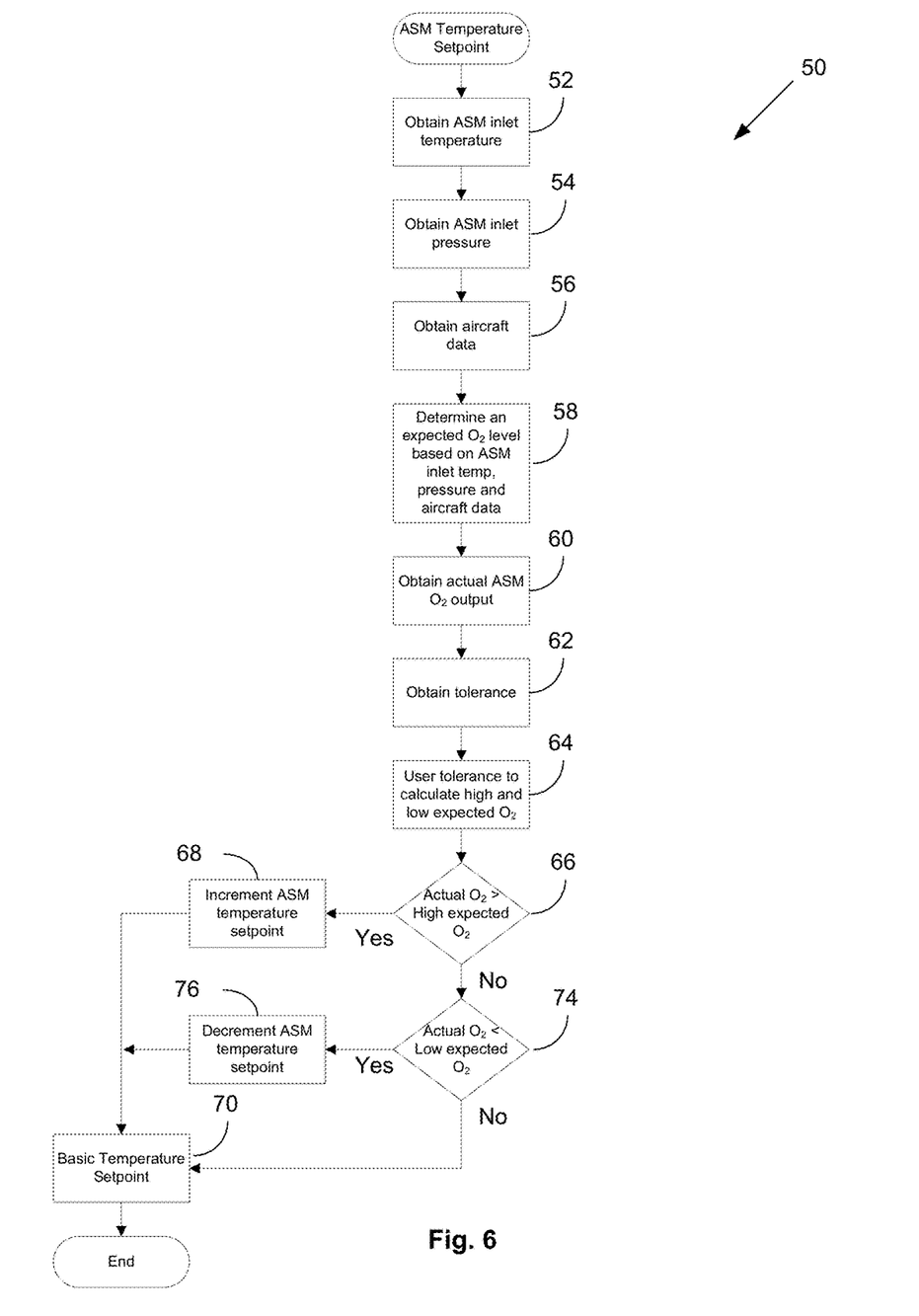
FIG. 6 is a flow chart illustrating an exemplary method for generating an ASM air inlet temperature setpoint in accordance with the present disclosure.

With additional reference to FIG. 6, illustrated are logical operations 50 to implement an exemplary method of generating an ASM air inlet temperature setpoint in accordance with the present disclosure. The exemplary method may at least be partially executed by the temperature setpoint control module 22. Although FIG. 6 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, etc. may be added to the logical flow for purposes of enhanced utility, performance, measurement, troubleshooting, and the like. It is understood that all such variations are within the scope of the present invention.

The method according to FIG. 6 dynamically modulates a temperature setpoint for regulating the air inlet temperature to the ASM 24. Steps 52-56 gather data related to determining the optimum ASM inlet air temperature setpoint. More specifically, at step 52 the actual ASM inlet air temperature is obtained, for example, via temperature sensor 26, while at step 54 the actual ASM air inlet pressure is obtained via pressure sensor 28. At step 56, aircraft data, such as atmospheric pressure, altitude, bleed pressure, etc., is obtained, for example, from measurement equipment and/or a flight control computer.

Having obtained the ASM inlet temperature, pressure and aircraft data, at step 58 the expected oxygen concentration at the output of the ASM 24 is determined. The expected oxygen concentration is the amount of oxygen expected at the output of the ASM 24 based on the conditions under which the ASM operates (i.e., inlet temperature, pressure, aircraft data, etc.). To determine the expected oxygen concentration at the output of the ASM 24, the collected data is used to retrieve a corresponding entry in database 34, which is shown in FIG. 3. The expected oxygen concentration for each entry in the database may be determined empirically and stored in the database 34. Also, while the database 34 is shown as having three different parameters (a three-dimensional database), this is merely exemplary and in practice the database 34 may have more or fewer parameters based on the application needs.

At step 60 the actual oxygen concentration at the output of the ASM 24 is obtained from oxygen sensor 32. Optionally at steps 62 and 64, a tolerance level may obtained for determining high and low thresholds for increasing or decreasing the temperature setpoint (e.g., a hysteresis or "deadband" in which no modification of the temperature setpoint is made). For example, if the tolerance is 5% and the expected oxygen level is 10% oxygen, then the high expected oxygen threshold is 10.5% oxygen while the low expected oxygen threshold is 9.5% oxygen. The tolerance may be stored in memory of the temperature setpoint control module 22, calculated by the temperature setpoint control module 22, or provided by an external device, e.g., a flight control computer or the like.

At step 66 the actual oxygen concentration as obtained at step 60 is compared to the high expected oxygen threshold as calculated at step 58 (or the corrected high expected oxygen threshold, which may be obtained by combining the high expected oxygen threshold found in step 58 with the tolerance obtained in step 62—if step 62 is implemented). If the actual oxygen concentration is greater than the high expected oxygen threshold (or high preset), this indicates that the ASM 24 is not operating at the required efficiency and therefore the method moves to step 68 where the ASM inlet air temperature setpoint is increased, e.g., by a prescribed value. A basic temperature setpoint then is output at step 70 for controlling the ASM air inlet temperature, and then the method may terminate, execute at predetermined intervals, or execute based on predefined events.

Moving back to step 66, if the actual oxygen concentration is not greater than the high expected oxygen threshold (or high preset), the method moves to step 74 where the actual oxygen concentration is compared to the low expected oxygen threshold as calculated at step 64 (or a low preset if optional steps 62 and 64 are not implemented). If the actual oxygen concentration is less than the low expected oxygen threshold (or low preset), this indicates that the ASM 24 is operating more efficiently than is required and therefore the method moves to step 76 where the ASM inlet air temperature setpoint is decreased, e.g., by a prescribed value. The method then moves to step 70 as described above. Moving back to step 74, if the actual oxygen concentration is not less than the low expected oxygen threshold (or low preset), the method moves to step 70 as described above.

Figure 7:
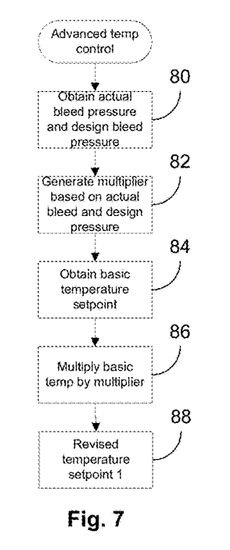
FIG. 7 is a flow chart illustrating an exemplary method for altering the temperature setpoint based on bleed pressure in accordance with the present disclosure.

Referring now to FIG. 7, illustrated are optional steps that may be applied to the basic temperature setpoint derived in the method of FIG. 6. The optional steps modify the basic temperature setpoint based on a comparison of actual bleed pressure from the compressed air source 12 to the design bleed pressure(s) used to construct the database 34. As bleed pressure increases the efficiency of the ASM 24 also increases, thus permitting lower ASM inlet temperatures. Conversely, as bleed air pressure decreases the efficiency of the ASM 24 decreases, which typically requires increased ASM inlet temperatures. The design of the system 10 may be based on a particular bleed pressure of the compressed air source 12, e.g., 20 PSI. During flight, however, the actual bleed pressure may vary and thus the expected oxygen concentration as obtained from the database 34 may not represent the maximum allowable oxygen concentration. The method of FIG. 7 compensates for such error.

More particularly, at step 80 the actual bleed pressure of the compressed air source 12 is determined, for example, via a measurement. Such measurement may be made by a bleed pressure sensor communicatively coupled to temperature setpoint control module 22. Alternatively, the actual bleed pressure may be provided to the temperature setpoint control module 22 as part of the aircraft data 30. Also obtained is the design bleed air pressure for the ASM 24. Such design bleed air pressure may be stored in the database 34, for example.

Next at step 82 a scale factor is generated based on the actual bleed air pressure and the design bleed air pressure. The scale factor may be based, for example, on a ratio of the design bleed air pressure and the actual bleed air pressure. For example, if the design bleed air pressure is 20 PSI and the actual bleed air pressure is 15 PSI, a scale factor of 20/15 (i.e., 1.33) may be generated. This scale factor may be further conditioned as needed using filters, amplifiers or the like.

Next at step 84 the basic temperature setpoint as derived in FIG. 6 is retrieved, for example, from memory of the controller. At step 86 the multiplier as derived at step 84 is applied to the basic temperature setpoint obtained at step 86 to produce an advanced temperature setpoint for the ASM air inlet temperature as indicated at step 88.

Figure 8:
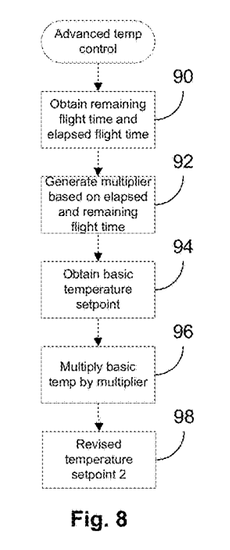
FIG. 8 is a flow chart illustrating an exemplary method for altering the temperature setpoint based on flight time in accordance with the present disclosure.

Referring now to FIG. 8, illustrated are other optional steps that may be included in the method of FIG. 6. The optional steps modify the basic temperature setpoint based on flight length. More particularly, the method of FIG. 8 modifies the basic temperature setpoint based on a comparison of the remaining flight time and the elapsed flight time.

Beginning at step 90, the remaining flight time and the actual flight time are obtained, for example, from a flight control computer. Next at step 92 a function generator generates an adjustment value (e.g., a value between 0 and 1) based on the remaining and elapsed flight time. The function generator generates an adjustment value that seeks to adjust the temperature setpoint downward if the projected flight duration is above a preset value, and ramps the temperature back to the base temperature setpoint once the aircraft is near decent. Next at step 94 either the basic temperature setpoint as derived in step 70 of FIG. 6, or the optional revised temperature setpoint as output at step 88 is retrieved, for example, from memory of the controller. At step 96 the adjustment value as derived at step 94 is applied to the basic temperature setpoint obtained at step 96 to produce an advanced temperature setpoint for the ASM air inlet temperature as indicated at step 98.

Figure 9:
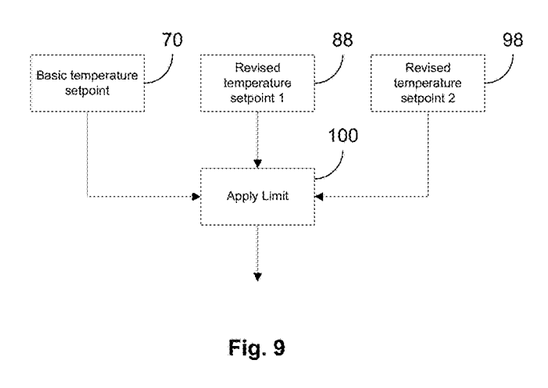
FIG. 9 is a flow chart illustrating an exemplary steps for limiting the temperature setpoint.

After all temperature setpoint adjustments are made, the process may then move to optional step 100 shown in FIG. 9, where the basic temperature setpoint as output at step 70, the optional revised temperature setpoint as output at step 88, or the optional revised temperature setpoint as output at step 98 is subjected to upper and lower limits (e.g., as a safety measure).

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A controller for controlling an on-board inert gas generation system (OBIGGS) having an air separation module (ASM), comprising:
   a processor and memory;
   logic stored in the memory and executable by the processor, the logic including
   logic configured to dynamically modulate a temperature setpoint for air inlet temperature to the ASM to provide a minimum temperature setpoint that produces a prescribed oxygen concentration at an output of the ASM, wherein said temperature setpoint is determined based on actual ASM performance relative to a minimum required ASM performance.

2. The controller according to claim 1, wherein the logic configured to dynamically modulate the temperature setpoint includes:

logic configured to determine an expected oxygen concentration at the output of the ASM; and logic configured to determine the ASM inlet temperature setpoint based on the expected oxygen concentration.

3. The controller according to claim 2, wherein the logic configured to determine an expected oxygen concentration includes logic configured to determine the expected oxygen concentration based on at least one of an actual inlet pressure to the ASM, an actual inlet temperature to the ASM, or aircraft data.

4. The controller according to claim 3, wherein the logic configured to determine the expected oxygen concentration based on at least one of an actual inlet pressure to the ASM, an actual inlet temperature to the ASM, or aircraft data includes logic configured to use at least one of atmospheric pressure, altitude, or bleed pressure as the aircraft data.

5. The controller according to claim 2, wherein the logic configured to determine the ASM inlet temperature setpoint based on the expected oxygen concentration includes logic configured to compare the expected oxygen concentration to an actual oxygen concentration output by the ASM, and to vary the air inlet temperature setpoint based on the comparison.

6. The controller according to claim 5, wherein the logic configured to vary the air inlet temperature setpoint includes:
    logic configured to compare the expected oxygen concentration to the actual oxygen concentration;
    logic configured to decrease the air inlet temperature setpoint when the expected oxygen concentration is greater than the actual oxygen concentration; and
    logic configured to increase the air inlet temperature setpoint when the expected oxygen concentration is less than the actual oxygen concentration.

7. The controller according to claim 1, wherein the logic configured to increase or decrease the air inlet temperature is further based on a pressure of bleed air provided to the OBIGGS.

8. The controller according to claim 6, wherein the logic configured to compare the expected oxygen concentration includes logic configured to implement a hysteresis function.

9. The controller according to claim 8, wherein the logic configured to implement the hysteresis function includes:
    logic configured to calculate a high expected oxygen concentration threshold and a low expected oxygen concentration threshold;
    logic configured to use the high expected oxygen concentration threshold as a basis for increasing the air inlet temperature setpoint; and
    logic configured to use the low expected oxygen concentration threshold as a basis for decreasing the air inlet temperature setpoint.

10. An on-board inert gas generation system (OBIGGS), comprising:
    an air separation module (ASM); and
    the controller according to claim 1.

11. The OBIGGS according to claim 10, further comprising:
    a temperature sensor for measuring the air inlet temperature to the ASM;
    a pressure sensor for measuring the air inlet pressure to the ASM; and
    an oxygen sensor for measuring an oxygen concentration of air exiting the ASM, the temperature, pressure and oxygen sensors communicatively coupled to the controller.

12. The OBIGGS according to claim 10, further comprising:
    a heat exchanger including an inlet for receiving air and an outlet for expelling temperature-modified air, the outlet in fluid communication with an inlet to the ASM; and
    a valve having an inlet in fluid communication with the heat exchanger inlet and an outlet in fluid communication with the heat exchanger outlet, wherein the controller is operatively coupled to the valve to control a temperature of the air provided to the ASM.

13. A method for controlling an on-board inert gas generation system (OBIGGS) having an air separation module (ASM), comprising dynamically modulating a temperature setpoint for air inlet temperature to the ASM to provide a minimum temperature setpoint that produces a prescribed oxygen concentration at an output of the ASM, wherein said temperature setpoint is determined based on actual ASM performance relative to a minimum required ASM performance.

14. The method according to claim 13, wherein dynamically generating the temperature setpoint includes:
    determining an expected oxygen concentration output by the ASM; and
    determining the ASM inlet temperature setpoint based on the expected oxygen concentration.

15. The method according to claim 14, wherein determining an expected oxygen concentration includes determining the expected oxygen concentration based on at least one of an actual inlet pressure to the ASM, an actual inlet temperature to the ASM, or aircraft data.

16. The method according to claim 15, wherein determining the expected oxygen concentration based on at least one of an actual inlet pressure to the ASM, an actual inlet temperature to the ASM, or aircraft data includes using at least one of atmospheric pressure, altitude, or bleed pressure as the aircraft data.

17. The method according to claim 14, wherein determining the ASM inlet temperature setpoint based on the expected oxygen concentration includes comparing the expected oxygen concentration to an actual oxygen concentration output by the ASM, and varying the air inlet temperature setpoint based on the comparison.

18. The method according to claim 17, wherein varying the air inlet temperature setpoint includes:
    comparing the expected oxygen concentration to the actual oxygen concentration;
    decreasing the air inlet temperature setpoint when the expected oxygen concentration is greater than the actual oxygen concentration; and
    increasing the air inlet temperature setpoint when the expected oxygen concentration is less than the actual oxygen concentration.

19. The method according to claim 13, wherein increasing or decreasing the air inlet temperature is further based on a pressure of bleed air provided to the OBIGGS.

20. The method according to claim 18, wherein comparing the expected oxygen concentration includes implementing a hysteresis function.

21. The method according to claim 20, wherein implementing the hysteresis function includes:
    calculating a high expected oxygen concentration threshold and a low expected oxygen concentration threshold;
    using the high expected oxygen concentration threshold as a basis for increasing the air inlet temperature setpoint; and using the low expected oxygen concentration threshold as a basis for decreasing the air inlet temperature setpoint.

22. A controller for controlling an on-board inert gas generation system having an air separation module, comprising:
 a processor and memory; and
 logic stored in the memory and executable by the processor, the logic configured to cause the processor to execute the method according to claim 13.

* * * * *